United States Patent
Cho et al.

(10) Patent No.: US 8,666,433 B2
(45) Date of Patent: Mar. 4, 2014

(54) LOCATION POSITIONING METHOD AND DEVICE USING WIRELESS LAN SIGNALS

(75) Inventors: Chae Hwan Cho, Gwacheon Si Gyeonggi-do (KR); Suk Yon Kang, Seoul (KR); Chang Seok Lee, Seoul (KR); Jin Hyo Park, Seoul (KR); Jong Tae Ihm, Seongnam Si Gyeonggi-do (KR)

(73) Assignees: SK Telecom Co., Ltd., Seoul (KR); SK Planet Co., Ltd., Seoul (KR)

( * ) Notice: Subject to any disclaimer, the term of this patent is extended or adjusted under 35 U.S.C. 154(b) by 24 days.

(21) Appl. No.: 13/696,485

(22) PCT Filed: May 4, 2011

(86) PCT No.: PCT/KR2011/003360
§ 371 (c)(1),
(2), (4) Date: Nov. 6, 2012

(87) PCT Pub. No.: WO2011/139105
PCT Pub. Date: Nov. 10, 2011

(65) Prior Publication Data
US 2013/0059602 A1 Mar. 7, 2013

(30) Foreign Application Priority Data
May 6, 2010 (KR) .......................... 10-2010-0042628

(51) Int. Cl.
*H04W 24/00* (2009.01)
(52) U.S. Cl.
USPC ...................................................... 455/456.1
(58) Field of Classification Search
USPC ............... 455/404.2, 457, 456.1–456.6, 458
See application file for complete search history.

(56) References Cited

U.S. PATENT DOCUMENTS

| 7,873,352 | B2 * | 1/2011 | Nguyen et al. ............... 455/411 |
| 7,969,930 | B2 * | 6/2011 | Kalhan ......................... 370/328 |
| 8,233,433 | B2 * | 7/2012 | Kalhan ......................... 370/328 |
| 8,433,334 | B2 * | 4/2013 | Huang et al. ............... 455/456.1 |
| 8,478,297 | B2 * | 7/2013 | Morgan et al. ............. 455/456.1 |
| 8,504,059 | B2 * | 8/2013 | Huang et al. ............... 455/456.1 |
| 8,538,457 | B2 * | 9/2013 | Morgan et al. ............. 455/456.1 |
| 2007/0121560 | A1 * | 5/2007 | Edge ............................ 370/338 |
| 2007/0204021 | A1 * | 8/2007 | Ekl et al. ....................... 709/223 |
| 2007/0281712 | A1 * | 12/2007 | Povey et al. ............... 455/456.1 |
| 2008/0032706 | A1 * | 2/2008 | Sheynblat et al. .......... 455/456.1 |

FOREIGN PATENT DOCUMENTS

| KR | 10-2005-0034762 | 4/2005 |
| KR | 10-2009-0089044 | 8/2009 |
| KR | 10-2009-0095773 | 9/2009 |
| KR | 10-2010-0030405 | 3/2010 |

OTHER PUBLICATIONS

International Search Report mailed Dec. 26, 2011 for PCT/KR2011/003360, citing the above references.

* cited by examiner

*Primary Examiner* — Kamran Afshar
*Assistant Examiner* — Khawar Iqbal
(74) *Attorney, Agent, or Firm* — Lowe Hauptman & Ham, LLP

(57) ABSTRACT

A location positioning methoded device using a wireless LAN signal, comprising: a database that includes a first DB, which matches grid cells distinguished by pCell ID with partial wireless LAN-related information related to a wireless LAN signal and stores the matched information, and a second DB, which stores overall wireless LAN-related information related to the wireless LAN signal; an information reception unit that receives terminal wireless LAN-related information from a terminal, which performs communication by using the WLAN signal; a record determination unit; and a location positioning unit.

19 Claims, 5 Drawing Sheets

| MAC Address | SSID | Lati-tude | Long-itude | Alti-tude | Addr-ess | Bldg floor | Coll-ection MD | Collection date | Number of pieces of raw data | Relia-bility | BS ID info | Update date |
|---|---|---|---|---|---|---|---|---|---|---|---|---|
| 00:11:33:11:3e:11 | S*bucks Gangnam | | | | | | Field | 20100321 | 20 | A | | |
| 00:11:33:11:3e:33 | S*T AP | | | | | | Own | 20100321 | | A | | |
| 00:11:33:11:3e:44 | N*spot | | | | | | Other | 20100102 | | B | | |
| 00:11:33:11:3e:44 | N*spot | | | | | | Field | 20100321 | 50 | A | | |
| | | | | | | | Auto | 20100321 | | A | | |

AP information / Base station information

LOCATION POSITIONING METHOD AND DEVICE USING WIRELESS LAN SIGNALS

CROSS REFERENCE TO RELATED APPLICATION

This application claims the priority of Korean Patent Application No. 10-2010-0042628 filed on May 6, 2010 in the KIPO (Korea Intellectual Property Office). Further, this application is the National Phase application of International Application No. PCT/KR2011/003360 filed May 4, 2011, which designates the United States and was published in Korean.

TECHNICAL FIELD

An embodiment of the present invention relates to a location positioning method and device using wireless LAN (WLAN) signals. More particularly, an embodiment of the present invention relates to a location positioning method and device using WLAN signals in which the WLAN signals are received from a terminal performing a communication using these signals, and in which the location of the terminal is determined on the basis of the first DB in which WLAN-related information associated with WLAN signals is matched to grid cells and stored and on the basis of the second DB in which overall WLAN-related information associated with WLAN signals is stored.

BACKGROUND ART

With remarkable growth of computer, electronic, and communication technologies, a great variety of wireless communication services using a wireless network have been developed and introduced. Thus, services offered by a mobile communication system using a wireless network are now making progress toward a multimedia communication service capable of transmitting circuit data, packet data, etc. as well as a traditional voice service.

Among various wireless Internet services using mobile communication terminals, LBS (Location Based Service) is recently drawing much attention in view of wide usability and convenience. LBS refers to a kind of communication service that finds the location of a mobile communication terminal such as a mobile phone, a PDA (Personal Digital Assistant), or the like, and provides additional information associated with the found location. Location positioning techniques used for LBS are normally classified into a network based type for finding the location in a software manner by using propagation environments (i.e., the cell radius of a base station in a mobile communication network), a handset based type using a GPS (Global Positioning System) receiver embedded in a mobile communication terminal, and a hybrid type of both types.

From among these types, the location positioning technique of network based type is being widely used in a GPS shadow zone. This technique, however, has a drawback that location positioning performance may be lowered due to repeater environments or the like. Additionally, less dense distribution of base stations themselves may often cause an inaccurate location positioning.

DETAILED DESCRIPTION OF THE INVENTION

Technical Problems

In order to solve the above-discussed problem, a main object of an embodiment of the present invention is to provide a location positioning method and device using WLAN signals in which the WLAN signals are received from a terminal performing a communication using these signals, and in which the location of the terminal is determined on the basis of WLAN-related information associated with WLAN signals matched to grid cells and overall WLAN-related information.

Technical Solutions

In order to accomplish the above object, an aspect of the present invention provides a location positioning device using WLAN signals, the device comprising: a database including a first DB which matches grid cells distinguished by pCell ID with partial wireless LAN (WLAN)-related information related to a WLAN signal and stores the matched information and a second DB which stores overall WLAN-related information related to the WLAN signal; an information reception unit for receiving terminal WLAN-related information from a terminal which performs communication by using the WLAN signal; a record determination unit for determining whether the same record information as the received terminal WLAN-related information is presorted in the database; and a location positioning unit for determining a location of the terminal by using a parameter included in the received terminal WLAN-related information and the result of positioning on whether the same record information is prestored.

Additionally, according to another aspect of the present invention, provided is a location positioning device using WLAN signals, the device comprising: a database including a first DB which matches grid cells distinguished by pCell ID with partial wireless LAN (WLAN)-related information related to a WLAN signal and stores the matched information and a second DB which stores overall WLAN-related information related to the WLAN signal; an information reception unit for receiving terminal WLAN-related information from a terminal which performs communication by using the WLAN signal; a record determination unit for determining whether the same record information as the received terminal WLAN-related information is presorted in the first DB; and a location positioning unit for determining a location of the terminal by using the first DB and a parameter included in the received terminal WLAN-related information when the same record information as the received terminal WLAN-related information is presorted in the first DB.

Additionally, according to another aspect of the present invention, provided is a location positioning device using WLAN signals, the device comprising: a database including a first DB which matches grid cells distinguished by pCell ID with partial WLAN-related information related to a WLAN signal and stores the matched information and a second DB which stores overall WLAN-related information related to the WLAN signal; an information reception unit for receiving terminal WLAN-related information from a terminal which performs communication by using the WLAN signal; a record determination unit for determining whether the same record information as the received terminal WLAN-related information is presorted in the first DB; and a location positioning unit for determining a location of the terminal by using the second DB and a parameter included in the received terminal WLAN-related information when the same record information as the received terminal WLAN-related information is not presorted in the first DB.

Additionally, according to another aspect of the present invention, provided is a location positioning method using WLAN signals, the method comprising: receiving terminal WLAN-related information from a terminal which performs communication by using a WLAN signal; determining whether the same record information as the received terminal WLAN-related information is presorted in the database; and determining a location of the terminal by using a parameter included in the received terminal WLAN-related information and the result of positioning on whether the same record information is prestored.

Advantageous Effects

As discussed above, according to an embodiment of the present invention, WLAN signals can be received from a terminal performing a communication using these signals, and the location of the terminal can be determined on the basis of WLAN-related information associated with WLAN signals matched to grid cells and overall WLAN-related information. According to an embodiment of the present invention, it is possible to position a more accurate location of the terminal using location information of APs (Access Points) that repeat WLAN signals. In addition, location positioning performance can be improved by simultaneously using base station information and WLAN information.

DESCRIPTION OF REFERENCE NUMERALS IN DRAWINGS

110: Mobile Communication Terminal
120: Location Calculation Server
130: WLAN Based Location Positioning Server
140: Database
142: First DB
144: Second DB
210: Information Reception Unit
220: Record Determination Unit
230: Location Positioning Unit
242: First Positioning Target Selection Unit
244: First Scoring Unit
246: Second Positioning Target Selection Unit
248: Second Scoring Unit
249: Score Aggregating Unit
252: Triangulation Based Positioning Unit
254: Weighted Average Based Positioning Unit
256: WLAN Signal Based Positioning Unit
258: Base Station Signal Based Positioning Unit
259: Reliability Classifying Unit

MODE FOR CARRYING OUT THE INVENTION

Hereinafter, some embodiments of the present invention will be described in detail with reference to the accompanying drawings. In the following description, the same elements will be designated by the same reference numerals although they are shown in different drawings. Further, a detailed description of known configurations and functions incorporated herein will be omitted when it may make the subject matter of the present invention rather unclear.

Additionally, in describing the elements of the present invention, there may be terms used like first, second, A, B, (a), and (b). These will be used solely for the purpose of differentiating one element from the other and not to imply or suggest the substances, order or sequence thereof. If a certain element is described as 'connected', 'coupled', or 'linked' to another element, they may be not only directly 'connected', 'coupled', or 'linked' but also indirectly 'connected', 'coupled', or 'linked' via the third element.

Figure 1:
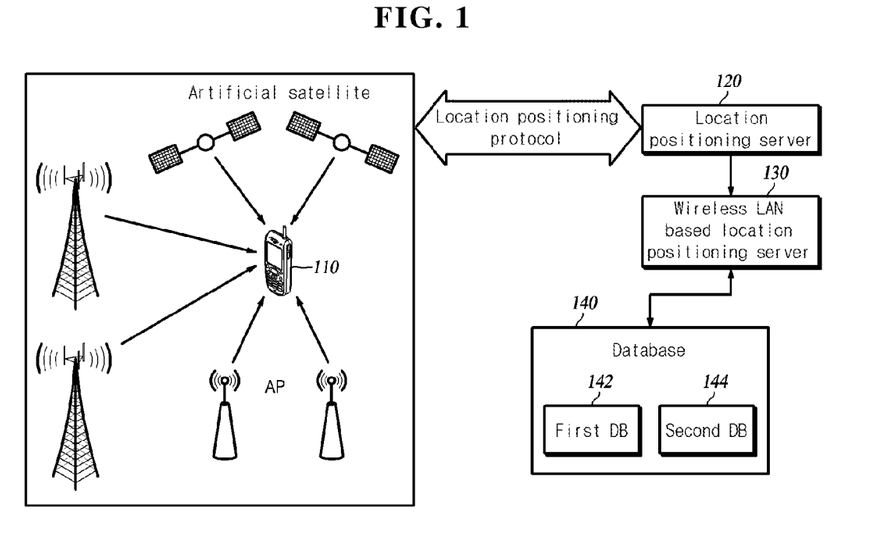
FIG. 1 is a block diagram illustrating a location positioning system using WLAN signals in accordance with an embodiment of the present invention.

FIG. 1 is a block diagram illustrating a location positioning system using WLAN signals in accordance with an embodiment of the present invention.

The location positioning system using WLAN signals according to an embodiment of this invention includes a mobile communication terminal 110, a location calculation server 120, a WLAN based location positioning server 130, and a database 140. Although in this embodiment the location positioning system includes the mobile communication terminal 110, the location calculation server 120, the WLAN based location positioning server 130, and the database 140, this is exemplary only and not to be considered as a limitation of the present invention. As will be understood by those skilled in the art, various changes in elements of the location positioning system may be made without departing from the essence of the invention. Here, the WLAN signals include at least one of Wi-Fi signals, WiMax signals, DTIM (Delivery Traffic Indication Message), and hot spot signals. DTIM is a kind of TIM which informs the wireless client about the presence of data on AP.

The mobile communication terminal 110 is a device that has a wireless communication module for performing typical voice communication and data communication. Using the wireless communication module, the mobile communication terminal 110 interacts with a mobile communication network (not shown) and performs typical voice communication and data communication in a radio communication manner. Meanwhile, the mobile communication terminal 110 sends information on base stations of the mobile communication network to the location calculation server 120.

Additionally, the mobile communication terminal 110 has a WLAN (Wireless Local Area Network) module, accesses the Internet through neighboring AP (Access Point) using the WLAN module, and receives various webpage data. Here, AP is a device for establishing a data communication, and more specifically, for reading a recipient address from sending information, designating the most suitable communication path, and allowing transmission to other communication network. Namely, AP may extract the destination of data packet, select the best communication path to the extracted destination, and deliver data packet to next device along the selected path. AP may share several lines in normal network environments. In this embodiment, AP may be used as a concept including a router, a repeater, a relay, a bridge, and any other equivalents.

Further, the mobile communication terminal 110 has a GPS (Global Positioning System) module, extracts navigation data from GPS signals received from at least one GPS satellite, and sends the extracted data to the location calculation server 120 through the mobile communication network.

In an embodiment of this invention, the mobile communication terminal 110 preferably includes, but not limited to, the GPS module.

The mobile communication terminal 110 may be one of a smart phone, a PC (Personal Computer), a notebook, a PDA (Personal Digital Assistant), and the like, which has the wireless communication module, the GPS module, and the WLAN module therein. Also, the mobile communication terminal 110 has a memory for storing applications associated with LBS (Location Based Service), a microprocessor for operation and control by executing programs, and the like.

A location positioning protocol, also referred to as a location determination protocol, refers to a specific protocol about standards of an application layer for location positioning. Any location positioning protocol may be available if it may allow transmission/reception of GPS signals and WLAN signals between the mobile communication terminal 110 and the location calculation server 120. IS-801 (Interim Standard-801), RRLP (Radio Resource Location Services Protocol), RRC (Radio Resource Control), SUPL (Secure User Plane Location), etc. may be used as the location positioning protocol. Meanwhile, SUPL 2.0 may be used as a location positioning protocol to send and receive GPS signals and WLAN signals together between the mobile communication terminal 110 and the location calculation server 120. However, this is exemplary only and not to be considered as a limitation of this invention. Here, SUPL allows direct transmission/reception of data related to location positioning between the location calculation server 120 and the mobile communication terminal 110 via a data transmission path. Therefore, SUPL may remove communications between network nodes required in conventional processes of location positioning, reduce costs for constructing nodes required for tracking a location, and provide a more exact location positioning service. In case where SUPL 2.0 is used, the mobile communication terminal 110 may measure RTD (Round Trip Delay) by using SUPL 2.0. Namely, when a communication is performed using WLAN signals or when WLAN parameters are set up, the mobile communication terminal 110 may set a location ID and multiple location IDs and then measure RTD including RTD Value, RTD Units and RTD Accuracy by means of WLAN AP Info.

Although the location calculation server 120 and WLAN based location positioning server 130 are separated from each other in this disclosure, this is exemplary only and not to be considered as a limitation of the invention. As will be understood by those skilled in the art, both servers may be realized as a single server without departing from the essence of the invention.

The location calculation server 120 receives satellite data through a self-constructed satellite receiver, and performs location positioning by using satellite data of the mobile communication terminal 110 that requires location positioning. Namely, the location calculation server 120 receives navigation data from the mobile communication terminal 110, and performs a function to calculate latitude and longitude coordinates of the mobile communication terminal 110. Additionally, the location calculation server 120 transmits aiding data for aiding location positioning of the mobile communication terminal 110, and performs a function to calculate a distance between the GPS satellite and the mobile communication terminal 110. Also, if location information is selectively received from the mobile communication terminal 110, the location calculation server 120 performs a function to transmit the received information to LBSP (Location Based Service Platform). The location calculation server 120 delivers, to a server for pCell location positioning, latitude/longitude data which is result data of location positioning, and PPM (Pilot Phase Measurement) data received from the mobile communication terminal 110. The location calculation server 120 receives a location request signal from LBSP, and transmits to HLR (Home Location Register) an SMREQ signal that contains a request for information about a target device for location positioning. Then the location calculation server 120 receives from HLR an smreq signal that contains a response to the request for information about a target device for location positioning. And then the location calculation server 120 determines a current location of the mobile communication terminal 110 by interacting with the mobile communication terminal 110, and transmits to LBSP a location result signal that contains results of location positioning.

Meanwhile, as the location calculation server 120, PDE (Position Determination Entity) may be used in the synchronous CDMA (Code Division Multiple Access) system, PS (Position Server) may be used in the asynchronous W-CDMA (Wideband CDMA) system, and SMLC (Serving Mobile Location Center) may be used in the GSM (Global System for Mobile communication) system. This is exemplary only and not to be considered as a limitation of this invention. In CDMA, PDE may perform location positioning using satellites and network-based location positioning using triangulation. In W-CDMA, PS may perform location positioning using satellites and basic cell-based location positioning. In GSM, SMLC may perform location positioning using satellites and cell-based location positioning.

The above-mentioned PPM data includes time/distance information of neighboring base stations and system information measured by the mobile communication terminal 110. Specifically, basic data collected by the mobile communication terminal 110 are information about a current serving system, a pilot signal of a neighboring base station, signal strength (Ec/Io), and the like. Information about a current serving system includes system ID (hereinafter, referred to as 'SID'), network ID (hereinafter, referred to as 'NID'), base station ID (hereinafter, referred to as 'BSID'), reference PN (hereinafter, referred to as 'Ref_PN') which is a current serving base station sector number, pilot phase in Ref_PN, signal strength, and the like. Also, a pilot signal of a neighboring base station includes distance data and time data, such as a neighboring base station sector number (i.e., measurement PN) collected from the mobile communication terminal 110, pilot phase in each measurement PN, signal strength, and the like. The above PPM data which is data related to location positioning in the CDMA system may be SFN-SFN (System Frame Number) observed time difference data or UE RX-TX time difference data in the W-CDMA system, or any other data related to location positioning in any other communication systems.

Although the location calculation server 120 is described above as being applied to CDMA and WCDMA to provide pCell location positioning, this is exemplary only and not to be considered as a limitation of the invention. Alternatively, as will be understood by those skilled in the art, the location calculation server 120 may be applied to WiBro, LTE (Long Term Evolution) and EPC (Evolved Packet Core) to provide pCell location positioning.

The WLAN based location positioning server 130 receives terminal WLAN-related information from the mobile communication terminal 110 that performs communication using WLAN signals. The WLAN based location positioning server 130 determines whether the same record information as the terminal WLAN-related information received from the mobile communication terminal 100 is prestored in the database 140, and determines a location of the mobile communication terminal 100 by using a parameter included in the received terminal WLAN-related information and the result of positioning on whether the same record information is prestored.

Here, the terminal WLAN-related information means WLAN-related information received from the mobile communication terminal 100 that performs communication using WLAN signals. Partial WLAN-related information refers to part of information associated with WLAN signals, i.e., information including a MAC address and received signal strength. Overall WLAN-related information refers to overall information related to the WLAN signals, i.e., information including at least one of MAC address information, received signal strength information, SSID information, latitude information, longitude information, altitude information, detailed address information including the number of floors, information on a collecting method, reliability information, number source information, and information on a DB generation date.

The WLAN based location positioning server 130 determines the location of the mobile communication terminal 110 using the first DB 142 upon determining that a MAC address included in the terminal WLAN-related information is identical to a MAC address included in the partial WLAN-related information prestored in the first DB 142 on the basis of the determination result.

For location positioning of the mobile communication terminal 110 using the first DB 142, the WLAN based location positioning server 130 determines the location of the mobile communication terminal 100 by using at least one of information on a distance between APs that repeat a WLAN signal using the overall WLAN-related information stored in the second DB 144, received signal strength of the WLAN signal, deviation information, level information, and a score according to the deviation information. In the meantime, grid cells are obtained by dividing a specific area into cells having a predetermined size. A grid cell includes pCell ID based on a reference PN and PSC (Primary Scrambling Code) corresponding to a base station located in the specific area. A grid cell may be set to a size of N×M. For example, a grid cell can be set in the form of a square having a size of 100×100, 50×50, 30×30, 25×25, 20×20, 10×10, 5×5 or 1×1. However, the grid cell is not limited thereto and can have various forms suitable for environments through optimization.

The WLAN based location positioning server 130 selects grid cells having the MAC address included in the terminal WLAN-related information and calculates the distance between APs that repeat the WLAN signal by comparing partial WLAN-related information matched to the selected grid cells with the terminal WLAN-related information using the overall WLAN-related information stored in the second DB 144. If the calculated distance exceeds a predefined distance, the grid cells having the MAC address are excluded from a positioning target. The WLAN based location positioning server 130 assigns scores to terminal WLAN-related information included in the selected grid cells in the order of received signal strengths thereof and determines the location of the mobile communication terminal using the sum of the scores.

The WLAN based location positioning server 130 selects candidate cells on the basis of the terminal WLAN-related information, calculates a first deviation value with respect to received signal strength included in the terminal WLAN-related signal from received signal strengths stored in the first DB, and assigns a first score corresponding to the first deviation value to each grid cell. Provided that the first deviation value is 'd', a weight table w=d×1.35 when d is in the range of 0 to 29, w=d×1.25 when d is in the range of 30 to 39, w=d× 1.15 when d is in the range of 40 to 49, w=d×1.0 when d is in the range of 50 to 59, w=d×0.9 when d is in the range of 60 to 69, w=d×0.75 when d is in the range of 70 to 79, w=d×0.6 when d is in the range of 80 to 89, and w=d×0.5 when d is greater than 90.

The WLAN based location positioning server 130 designates a MAC address of a signal with highest received signal strength in the terminal WLAN-related information as a reference MAC address, and selects grid cells including the reference MAC address in the first DB 142 as candidate cells, selects grid cells including a MAC address corresponding to received signal strength higher than a predetermined threshold value in the terminal WLAN-related information as the candidate cells, selects grid cells including all MAC addresses included in the terminal WLAN-related information as the candidate cells, or selects candidate cells on the basis of wireless propagation environment information received from the mobile communication terminal 110. This is exemplary and the WLAN based location positioning server 130 can use methods modified and changed in various manners without departing the spirit of the present invention to select the candidate cells. The WLAN based location positioning server 130 excludes, from the positioning target, a MAC address corresponding to received signal strength lower than a specific level from among MAC addresses other than the MAC address corresponding to the highest received signal strength of the terminal WLAN-related information.

The WLAN based location positioning server 130 calculates a second deviation value with respect to received signal strength included in the remaining MAC addresses from the received signal strengths stored in the first DB 142, and assigns a second score corresponding to the second deviation value to each grid cell. The WLAN based location positioning server 130 sums up the first score and the second score assigned to each candidate cell and determines the location of the mobile communication terminal 100 using the score sum.

The WLAN based location positioning server 130 selects only candidate cells having score sums greater than a minimum value. When the number of cells having a maximum score sum is one from among the cells having score sums greater than the minimum value, the WLAN based location positioning server 130 determines the center value of the cell having the maximum score sum as a location value of the mobile communication terminal 110. When there is a plurality of cells having the maximum score sum, the WLAN based location positioning server 130 calculates a weighted average of the plurality of cells and determines the calculated weighted average as a location value of the mobile communication terminal 110. Here, a weighted average is a mean value considering weights of measured values according to degree of importance of a target.

Upon determining that the MAC address included in the partial WLAN-related information prestored in the first DB 142 does not correspond to any MAC address included in the terminal WLAN-related information, the WLAN based location positioning server 130 determines the location of the mobile communication terminal 110 using the second DB 144.

Upon determining that the number of MAC addresses corresponding to MAC addresses included in the overall WLAN-related information prestored in the second DB, from among the MAC addresses included in the received terminal WLAN-related information, is equal to or greater than a first number, the WLAN based location positioning server 130 determines the location of the mobile communication terminal 110 by performing triangulation on the basis of the locations of APs with respect to the corresponding MAC addresses or RTDs measured by the mobile communication terminal 110. Here, while the first number is preferably 3, it is not limited thereto. The WLAN based location positioning server 130 performs triangulation only using a MAC address with high reliability information from among the MAC addresses corresponding to the MAC addresses included in the overall WLAN-related information prestored in the second DB 144, from among the MAC addresses included in the received terminal WLAN-related information. When a plurality of MAC addresses with high reliability information is present, the WLAN based location positioning server 130 performs triangulation on the basis of AP location information provided by a service provider, AP location information received from the outside, and RTDs measured by the mobile communication terminal 110. Provided that the number of MAC addresses corresponding the MAC addresses included in the overall WLAN-related information prestored in the second DB 144, from among the MAC addresses included in the received terminal WLAN-related information, is smaller than the first number and equal to or greater than a second number, the WLAN based location positioning server 130 determines the location of the mobile communication terminal 110 by calculating a weighted average on the basis of the locations of APs with respect to the corresponding MAC addresses. While the second number is preferably 2, it is not limited thereto. If the number of MAC addresses corresponding to the MAC addresses included in the overall WLAN-related information prestored in the second DB 144, from among the MAC addresses included in the received terminal WLAN-related information, is smaller than the second number and equal to or greater than a third number, the WLAN based location positioning server 130 determines the location of an AP with respect to the corresponding MAC address as the location of the mobile communication terminal 110. While the third number is preferably 1, it is not limited thereto.

When no MAC address included in the received terminal WLAN-related information corresponds to any MAC address included in the overall WLAN-related information prestored in the second DB 144, the WLAN based location positioning server 130 determines the location of the mobile communication terminal 110 using a base station signal. Specifically, the WLAN based location positioning server 130 may extract a matched grid cell from the first DB 142 using the base station signal and determine the center value of the grid cell as the location of the mobile communication terminal 110.

The WLAN based location positioning server 130 classifies reliability information on the basis of first type information, second type information, third type information and fourth type information which are collection method information included in the overall WLAN-related information stored in the second DB 144. The WLAN based location positioning server 130 determines the location of the mobile communication terminal 110 only using overall WLAN-related information set to high reliability on the basis of the classified reliability information.

When first additional information corresponding to overall WLAN-related information including the third type information or fourth type information is additionally provided to the second DB while first stored information corresponding to overall WLAN-related information including the first type information or second type information is prestored in the second DB 144, if a MAC address of the first additional information is not identical to a MAC address of the first stored information, the WLAN based location positioning server 130 sets reliability information of the first additional information to high reliability. If the MAC address of the first additional information is identical to the MAC address of the first stored information, the WLAN based location positioning server 130 calculates a distance difference using AP location information related to the first stored information and AP location information related to the first additional information. When the calculated distance difference is within a predetermined distance, the WLAN based location positioning server 130 sets reliability information of the first stored information to high reliability and sets the reliability information of the first additional information to low reliability. If the calculated distance different exceeds the predetermined distance, the WLAN based location positioning server 130 sets the reliability information of the first stored information to low reliability and sets the reliability information of the first additional information to high reliability.

When second additional information corresponding to overall WLAN-related information including the first type information or second type information is additionally provided to the second DB while second stored information corresponding to overall WLAN-related information including the third type information or fourth type information is prestored in the second DB 144, if a MAC address of the second additional information is not identical to a MAC address of the second stored information, the WLAN based location positioning server 130 sets reliability information of the second additional information to high reliability. If the MAC address of the second additional information is identical to the MAC address of the second stored information, the WLAN based location positioning server 130 calculates a distance difference using AP location information related to the second stored information and AP location information related to the second additional information. When the calculated distance difference is within a predetermined distance, the WLAN based location positioning server 130 sets the reliability information of the second additional information to high reliability and sets reliability information of the second stored information to low reliability. If the calculated distance different exceeds the predetermined distance, the WLAN based location positioning server 130 sets the reliability information of the second additional information to high reliability and sets the reliability information of the second stored to low reliability.

While the WLAN based location positioning server 130 classifies reliability information as high reliability information and low reliability information in the present invention, the reliability information is not limited to the high reliability information and low reliability information and it may be subdivided through an optimization procedure.

While the database 140 is separated from the WLAN-based location positioning server 130 in the present invention, this is an example only and not to be considered as a limitation of the present invention. As will be understood by those skilled in the art, the database 140 may be implemented in the WLAN-based location positioning server 130 without departing from the essence of the invention.

The database 140 means a general data structure that is implemented in a storage space (e.g., a hard disc or memory) of a computer system by using a database management program (i.e., DBMS). Also, the database 140 refers to a data storage form where data search (extraction), deletion, edition, addition, etc. are free. And also, the database 140 may be embodied using a relational database management system (RDBMS) such as Oracle, Infomix, Sybase, and DB2, an object oriented database management system (OODBMS) such as Gemston, Orion, and O2, or XML Native Database such as Excelon, Tamino, and Sekaiju, depending on the purpose of an embodiment of the invention, and having appropriate fields or elements for performing its own functions.

The database 140 includes the first DB 142 which matches grid cells distinguished by pCell ID with partial WLAN-related information associated with a WLAN signal and stores the matched information, and the second DB 144 which stores overall WLAN-related information associated with the WLAN signal. The first DB 142 matches base station based wireless propagation environment information and WLAN based partial WLAN-related information with the grid cells and stores the matched information. The partial WLAN-related information includes at least one of MAC addresses with respect to APs that repeat the WLAN signal, received signal strength for each MAC address, AP channel information, AP frequency information, and RTDs measured by the mobile communication terminal 110.

The second DB 144 includes at least one of MAC address information on APs that repeat the WLAN signal, SSID information, latitude information, longitude information, altitude information, address information, information on the number of floors of a building, collection method information, collection date information, information on the number or pieces of raw data, reliability information, identification information on a base station communicating with the mobile communication terminal 110, and base station update date information. The collection method information is classified as first type information (own) corresponding to AP location information provided by the service provider, second type information (Other) corresponding to AP location information received from the outside, third type information (field) corresponding to AP location information received through field survey, and fourth type information (auto) corresponding to information on an AP which collects log data of the mobile communication terminal 110. Here, the first type information and the second type information may be recognized as actual AP location information and the third type information and fourth type information may be recognized as estimated AP location information.

Figure 2:
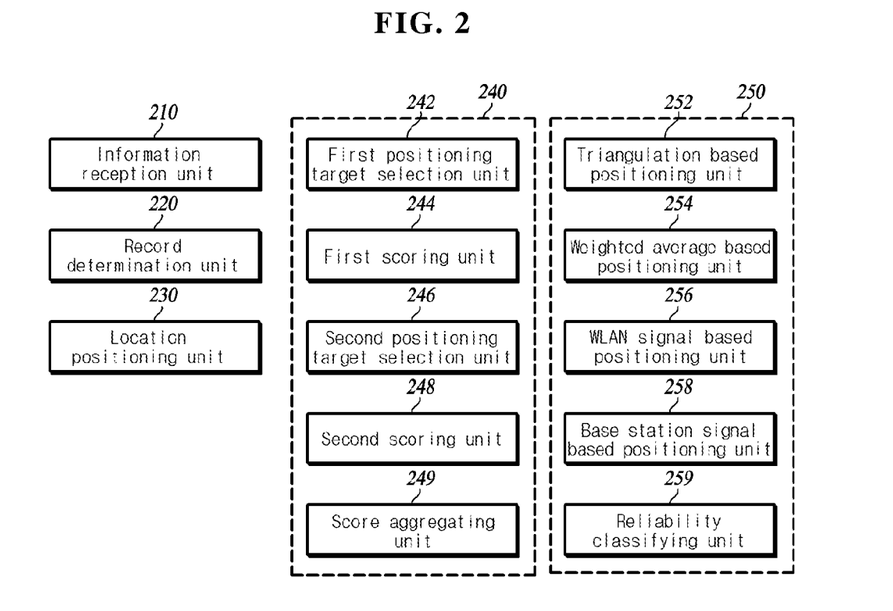
FIG. 2 is a block diagram illustrating a location positioning device using WLAN signals in accordance with an embodiment of the present invention.

FIG. 2 is a block diagram illustrating a location positioning device using WLAN signals in accordance with an embodiment of the present invention.

The WLAN based location positioning server 130 according to an embodiment of this invention includes an information reception unit 210, a record determination unit 220, a location positioning unit 230, a first positioning target selection unit 242, a first scoring unit 244, a second positioning target selection unit 246, a second scoring unit 248, a score aggregating unit 249, a triangulation based positioning unit 252, a weighted average based positioning unit 254, a WLAN signal based positioning unit 256, a base station signal based positioning unit 258, and a reliability classifying unit 259. Although in this embodiment the WLAN based location positioning server 130 includes the information reception unit 210, the record determination unit 220, the location positioning unit 230, the first positioning target selection unit 242, the first scoring unit 244, the second positioning target selection unit 246, the second scoring unit 248, the score aggregating unit 249, the triangulation based positioning unit 252, the weighted average based positioning unit 254, the WLAN signal based positioning unit 256, the base station signal based positioning unit 258, and the reliability classifying unit 259, this is exemplary only and not to be considered as a limitation of the present invention. As will be understood by those skilled in the art, various changes in elements of the WLAN based location positioning server 130 may be made without departing from the essence of the invention.

The information reception unit 210 receives terminal WLAN-related information from the mobile communication terminal 110 that performs communication using WLAN signals. The record determination unit 220 determines whether the same record information as the received terminal WLAN-related information is prestored in the database.

The location positioning unit 230 determines a location of the mobile communication terminal 110 using the determination result of the record determination unit 220 and a parameter included in the received terminal WLAN-related information. The location positioning unit 230 determines the location of the mobile communication terminal 110 using the first DB 142 upon determining that a MAC address included in the terminal WLAN-related information is identical to a MAC address included in partial WLAN-related information prestored in the first DB 142 on the basis of the determination result of the record determination unit 220.

For location positioning of the mobile communication terminal 110 using the first DB 142, the location positioning unit 230 determines the location of the mobile communication terminal 110 using at least one of information on a distance between APs that repeat a WLAN signal using overall WLAN-related information stored in the second DB 144, received signal strength information of the WLAN signal, deviation information, level information, and a score according to the deviation information. The location positioning unit 230 assigns scores classified according to received signal strength to terminal WLAN-related information included in selected grid cells and determines the location of the mobile communication terminal 110 using the sum of the scores. The location positioning unit 230 determines the location of the mobile communication terminal using the sum of first and second scores. The location positioning unit 230 selects only candidate cells having score sums greater than a minimum value. When the number of cells having a maximum score sum, from among the cells having score sums greater than the minimum value, is 1, the location positioning unit 230 determines the center value of the corresponding cell as a location value of the mobile communication terminal 110. Here, the minimum value may be a predetermined threshold value. When a plurality of cells has the maximum score sum, from among the cells having score sums greater than the minimum value, the location positioning unit 230 calculates a weighted average of the cells having the maximum score sum and determines the calculated weighted average as the location value of the mobile communication terminal 110.

Upon determining that the MAC address included in the terminal WLAN-related information prestored in the first DB 142 is not identical to the MAC address included in the terminal WLAN-related information on the basis of the determination result of the record determination unit 220, the location positioning unit 230 determines the location of the mobile communication terminal 110 using the second DB 144. The location positioning unit 230 determines the location of the mobile communication terminal 110 only using overall WLAN-related information set to high reliability on the basis of reliability information classified by the reliability classifying unit 259.

The first positioning target selection unit 242, the first scoring unit 244, the second positioning target selection unit 246, the second scoring unit 248 and the score aggregating unit 249 may be implemented as the location positioning unit 230 using the first DB.

The first positioning target selection unit 242 selects grid cells having MAC addresses included in the terminal WLAN-related information and calculates a distance between APs that repeat a WLAN signal by comparing partial WLAN-related information matched to the selected grid cells with the terminal WLAN-related information by using the overall WLAN-related information stored in the second DB 144. If the distance exceeds a predetermined distance, the first positioning target selection unit 242 excludes the grid cells having the MAC addresses from a positioning target.

The first scoring unit 244 designates a MAC address corresponding to a signal with highest received signal strength from among the terminal WLAN-related information as a reference MAC address. The first scoring unit 244 selects grid cells including the reference MAC address in the first DB 142 as candidate cells, selects grid cells including MAC addresses corresponding to received signal strengths higher than a predetermined threshold value in the terminal WLAN-related information as candidate cells, selects grid cells including all MAC addresses included in the terminal WLAN-related information as candidate cells, or selects candidate cells on the basis of wireless propagation environment information received from the mobile communication terminal 110. This is exemplary only and various changes in the first scoring unit 244 may be made to select the candidate cells without departing from the essence of the invention. The first scoring unit 244 calculates a first deviation value with respect to received signal strength included in the terminal WLAN-related information from the received signal strengths stored in the first DB 142 and assigns a first score corresponding to the first deviation value to each corresponding grid cell.

The second positioning target selection unit 246 excludes, from the positioning target, cells having MAC addresses corresponding to received signal strengths lower than a specific level from among MAC addresses other than the MAC address corresponding to the highest received signal strength of the terminal WLAN-related information. The second scoring unit 248 calculates a second deviation value with respect to received signal strength included in the other MAC addresses from the received signal strengths stored in the first DB and assigns a second score corresponding to the second deviation value to each grid cell. The score aggregating unit 249 sums up the first and second scores assigned to each candidate cell.

The triangulation based positioning unit 252, the weighted average based positioning unit 254, the base station signal based positioning unit 258, and the reliability classifying unit 259 may be implemented as the location positioning unit 230 using the second DB.

When the number of MAC addresses identical to the MAC address included in the overall WLAN-related information prestored in the second DB 144, from among the MAC addresses included in the received terminal WLAN-related information, is a first number or more, the triangulation based positioning unit 252 determines the location of the mobile communication terminal by performing triangulation on the basis of the locations of APs corresponding to the one or more MAC addresses. The triangulation based positioning unit 252 receives RTDs measured by the mobile communication terminal 110. Upon determining that the number of RTDs is the first number or more, the triangulation based positioning unit 252 can determine the location of the mobile communication terminal through triangulation based on the RTDs. Here, while the first number is preferably 3 or more, it is not limited thereto. The triangulation based positioning unit 252 performs triangulation only using a MAC address with high reliability information from among the MAC addresses identical to the MAC address included in the overall WLAN-related information prestored in the second DB 144, from among the MAC addresses included in the received terminal WLAN-related information. When a plurality of MAC addresses with high reliability is present, the triangulation based positioning unit 252 performs triangulation on the basis of AP location information provided by the service provider and AP location information received from the outside.

When the number of MAC addresses identical to the MAC address included in the overall WLAN-related information prestored in the second DB 144, from among the MAC addresses included in the received terminal WLAN-related information, is smaller than the first number and equal to or greater than a second number, the weighted average based positioning unit 254 calculates a weighted average on the basis of the locations of APs corresponding to the MAC addresses and determines the location of the mobile communication terminal 110 using the weighted average. Here, while the second number is preferably 2, it is not limited thereto.

When the number of MAC addresses identical to the MAC address included in the overall WLAN-related information prestored in the second DB 144, from among the MAC addresses included in the received terminal WLAN-related information, is smaller than the second number and equal to or greater than a third number, the WLAN signal based positioning unit 256 determines the location of an AP corresponding to the MAC address as the location of the mobile communication terminal 110. Here, while the third number is preferably 1, it is not limited thereto.

The base station signal based positioning unit 258 determines the location of the mobile communication terminal 110 using a base station signal when any of the MAC addresses included in the received terminal WLAN-related is not identical to the MAC address included in the overall WLAN-related information prestored in the second DB 144.

The reliability classifying unit 259 classifies reliability information on the basis of first type information, second type information, third type information and fourth type information which are collection method information included in the overall WLAN-related information stored in the second DB 144. When first additional information corresponding to overall WLAN-related information including the third type information or fourth type information is additionally provided to the second DB while first stored information corresponding to overall WLAN-related information including the first type information or second type information is prestored in the second DB 144, if a MAC address of the first additional information is not identical to a MAC address of the first stored information, the reliability classifying unit 259 sets reliability information of the first additional information to high reliability. If the MAC address of the first additional information is identical to the MAC address of the first stored information, the reliability classifying unit 259 calculates a distance difference using AP location information related to the first stored information and AP location information related to the first additional information. When the calculated distance difference is within a predetermined distance, the reliability classifying unit 259 sets reliability information of the first stored information to high reliability and sets the reliability information of the first additional information to low reliability. If the calculated distance different exceeds the predetermined distance, the reliability classifying unit 259 sets the reliability information of the first stored information to low reliability and sets the reliability information of the first additional information to high reliability.

When second additional information corresponding to overall WLAN-related information including the first type information or second type information is additionally provided to the second DB while second stored information corresponding to overall WLAN-related information including the third type information or fourth type information is prestored in the second DB 144, if a MAC address of the second additional information is not identical to a MAC address of the second stored information, the reliability classifying unit 259 sets reliability information of the second additional information to high reliability. If the MAC address of the second additional information is identical to the MAC address of the second stored information, the reliability classifying unit 259 calculates a distance difference using AP location information related to the second stored information and AP location information related to the second additional information. When the calculated distance difference is within a predetermined distance, the reliability classifying unit 259 sets the reliability information of the second additional information to high reliability and sets reliability information of the second stored information to low reliability. If the calculated distance different exceeds the predetermined distance, the reliability classifying unit 259 sets the reliability information of the second additional information to high reliability and sets the reliability information of the second stored to low reliability.

Figure 3:
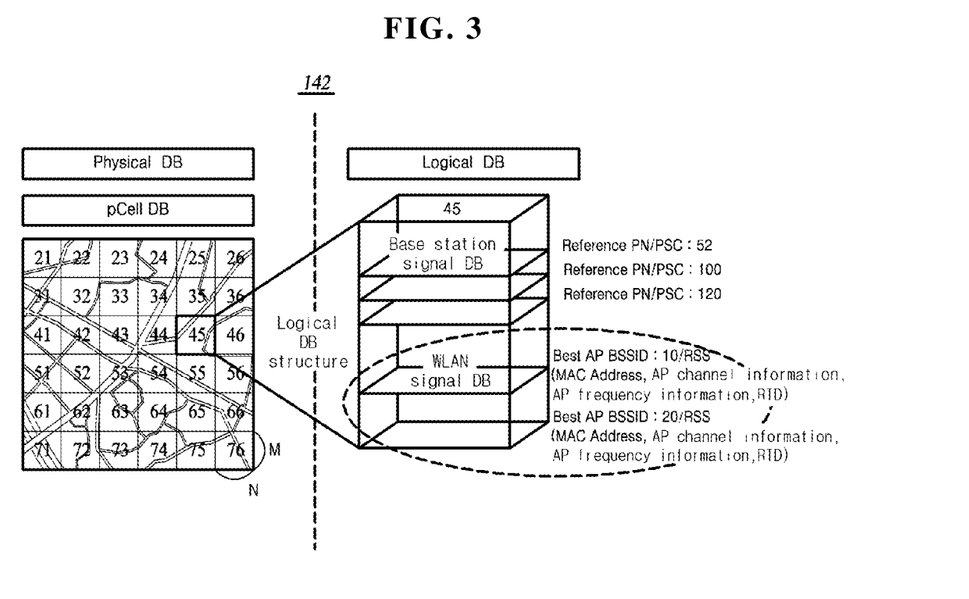
FIG. 3 is an example view illustrating a first DB in accordance with an embodiment of the present invention.

FIG. 3 illustrates the first DB according to an embodiment of the present invention.

The first DB 142 shown in FIG. 3 matches grid cells distinguished by pCell ID with partial WLAN-related information associated with a WLAN signal and stores the matched information. In addition, the first DB 142 matches base station based wireless propagation environment information and WLAN based partial WLAN-related information with the grid cells and stores the matched information. The partial WLAN-related information includes at least one of MAC addresses with respect to APs that repeat the WLAN signal, received signal strength for each MAC address, AP channel information, AP frequency information, and RTDs measured by the mobile communication terminal 110.

Namely, referring to a physical structure as shown in FIG. 3, the first DB 142 divides a target area of location measurement service into grids having a given size, defines each grid as pCell, and constructs pCell database using results of location positioning for each pCell. The grid cells shown in FIG. 3 are cells into which a particular area is divided with a given size, and include pCell ID based on PSC and a base station sector number for a base station located in the area. Namely, the grid cells may be set to M×N size. For example, the grid cells may be set as a square form such as 100×100, 50×50, 30×30, 25×25, 20×20, 10×10, 5×5 and 1×1. However, the grid cells are not limited to the above examples and may be set in various forms suitable for respective environments through optimization.

Meanwhile, referring to a logical structure of the first DB 142 shown in FIG. 3, the database basically includes information about a current serving system, a pilot signal of a neighboring base station, signal strength (Ec/Io), and the like. The information about the current serving system includes system ID (SID), network ID (N ID), base station ID (BSID), reference PN (Ref_PN) which is a current serving base station sector number, pilot phase in Ref_PN, signal strength, and the like. Additionally, one or more of MAC address information corresponding to identification information about an AP that transmits/receives WLAN signals to/from the mobile communication terminal 110, received signal intensity for each MAC address, AP channel information, AP frequency information, and RTD measured by the mobile communication terminal 110 may be matched and stored in the first DB 142.

The first DB 142 means a general data structure that is implemented in a storage space (e.g., a hard disc or memory) of a computer system by using a database management program (i.e., DBMS). Also, the first DB 142 refers to a data storage form where data search (extraction), deletion, edition, addition, etc. are free. And also, the first DB 142 may be embodied using a relational database management system (RDBMS) such as Oracle, Infomix, Sybase, and DB2, an object oriented database management system (OODBMS) such as Gemston, Orion, and O2, or XML Native Database such as Excelon, Tamino, and Sekaiju, depending on the purpose of an embodiment of the invention, and having appropriate fields or elements for performing its own functions.

Figure 4:
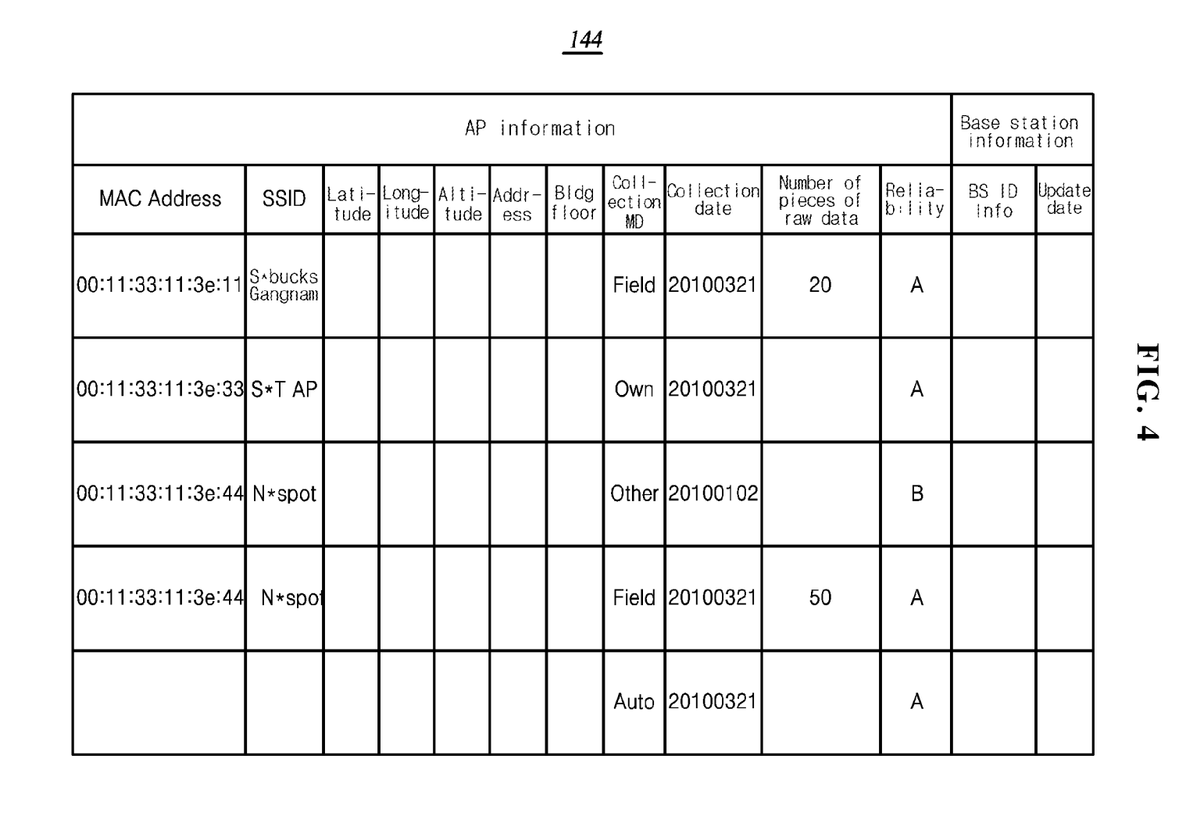
FIG. 4 is an example view illustrating a second DB in accordance with an embodiment of the present invention.

FIG. 4 is an example view illustrating the second DB in accordance with an embodiment of the present invention.

The second DB 144 stores overall WLAN-related information associated with a WLAN signal. The second DB 144 includes at least one of MAC address information of APs that repeat the WLAN signal, SSID information, latitude information, longitude information, altitude information, address information, information on the number of floors of a building, collection method information, collection date information, information on the number of pieces of raw data, reliability information, identification information of a base station that communicates with the mobile communication terminal 110, and base station update date information.

That is, a MAC address shown in FIG. 4 is unique information for identifying the corresponding AP and refers to BSSID (Basic Service Set Identifier). The MAC address may be allocated a total of 48 bits, and 24 bits among the 48 bits correspond to information allocated by a manufacturer. SSID (Service Set Identifier) is also used to identify the corresponding AP and represents a value set by a user. For example, SSID is set to 'S#bucks Gangnam', 'S*T AP', 'Ne*pot', etc., for example, and identifies corresponding APs. RSS represents received signal strength of the corresponding AP, and latitude, longitude and altitude indicate coordinate values of the latitude, longitude and altitude of the corresponding AP. Address information represents the address number of a corresponding address, and the information on the number or floors of a building refers to information about the number of floors of a corresponding building, at which APs are installed when the area corresponding to the address information is a building. The collection method information is classified as first type information (own) corresponding to AP location information provided by the service provider, second type information (Other) corresponding to AP location information received from the outside, third type information (field) corresponding to AP location information received through field survey, and fourth type information (auto) corresponding to information on an AP which collects log data of the mobile communication terminal 110. Here, the first type information and the second type information may be recognized as actual AP location information and the third type information and fourth type information may be recognized as estimated AP location information.

The collection date information refers to a DB generation date and represents the date when corresponding information is generated. The collection date information can be used to sort a DB as the newest DB when the DB is updated or to classify data. The information on the number of pieces of raw data represents the number of pieces of raw data collected through field survey. It is predicted that reliability of estimated AP location information is high as the number of pieces of raw data increases by using this information. The reliability information may be classified as high reliability information (A) and low reliability information (B). The reliability information is not limited to high reliability information and low reliability information and it can be subdivided through optimization. The base station identification information is used to identify a base station that communicates with the mobile communication terminal 110 and may be PN information representing sector information of the base station. The base station update date information includes information on a base station identification information generation date. If the base station identification information is updated, the base station update date information can include information on the update date. In addition, the base station update date information can be used to sort a DB as the newest DB when the DB is updated or classify data.

The second DB 144 means a general data structure that is implemented in a storage space (e.g., a hard disc or memory) of a computer system by using a database management program (i.e., DBMS). Also, the second DB 144 refers to a data storage form where data search (extraction), deletion, edition, addition, etc. are free. And also, the second DB 144 may be embodied using a relational database management system (RDBMS) such as Oracle, Infomix, Sybase, and DB2, an object oriented database management system (OODBMS) such as Gemston, Orion, and O2, or XML Native Database such as Excelon, Tamino, and Sekaiju, depending on the purpose of an embodiment of the invention, and having appropriate fields or elements for performing its own functions.

Figure 5:
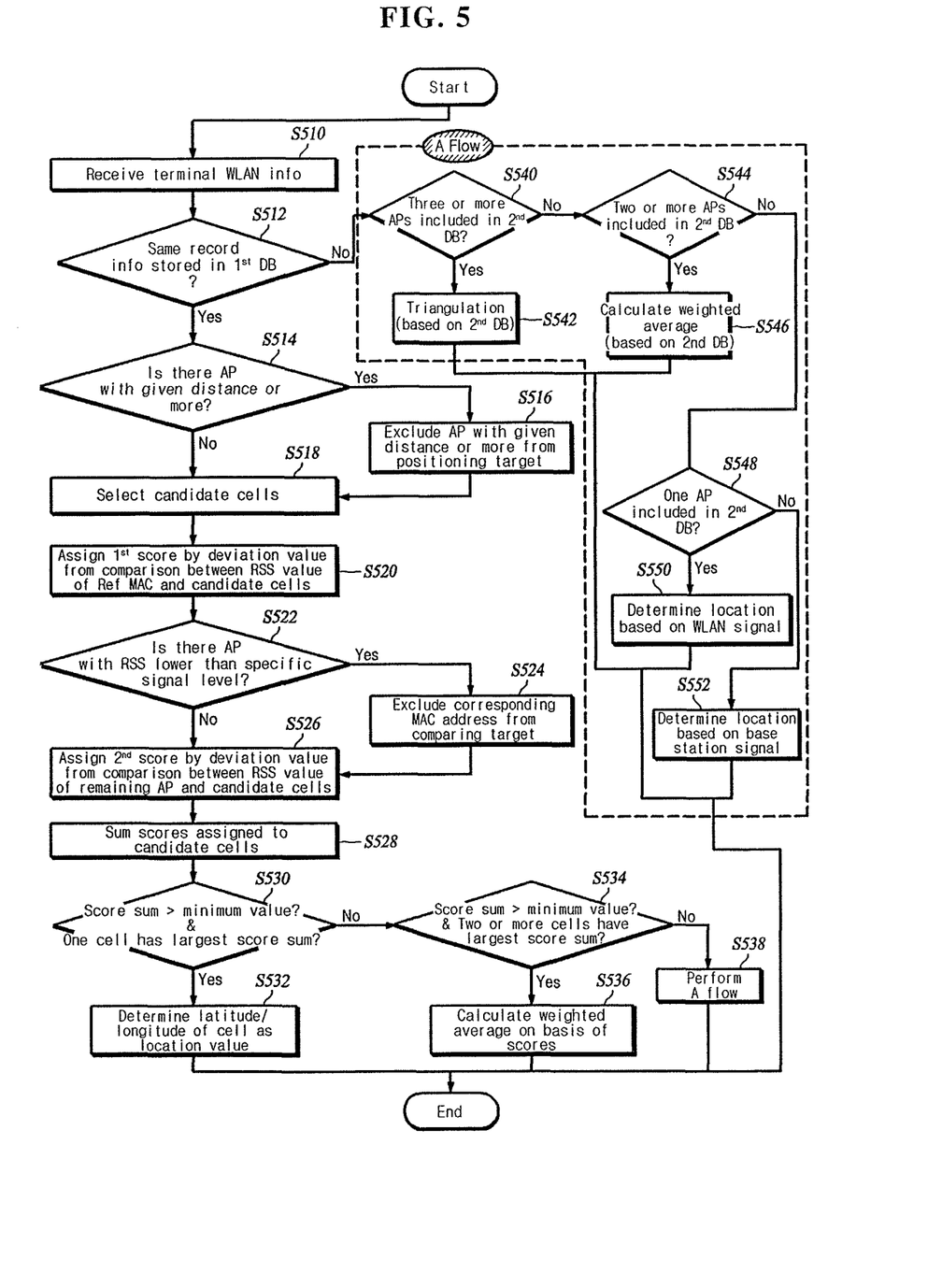
FIG. 5 is a flow diagram illustrating a location positioning method using WLAN signals in accordance with an embodiment of the present invention.

FIG. 5 is a flow diagram illustrating a location positioning method using WLAN signals in accordance with an embodiment of the present invention.

The WLAN-related location positioning server 130 receives terminal WLAN-related information from the mobile communication terminal 110 that performs communication using WLAN signals (S510). The WLAN-related location positioning server 130 determines whether the same record information as the terminal WLAN-related information received from the mobile communication terminal 110 is previously stored in the first DB 142 (S512).

Upon determining that a MAC address included in the terminal WLAN-related information corresponds to a MAC address included in partial WLAN-related information previously stored in the first DB 142 on the basis of the determination result of step S512, the WLAN-related location positioning server 130 selects grid cells having the MAC address included in the terminal WLAN-related information, calculates a distance between APs that repeat a WLAN signal by comparing partial WLAN-related information matched to the selected grid cells with the terminal WLAN-related information using overall WLAN-related information stored in the second DB 144, and checks whether the calculated distance exceeds a predetermined distance (S514).

When the calculated distance exceeds the predetermined distance, the WLAN-related location positioning server 130 excludes the grid cells having the corresponding MAC address from a positioning target (S516).

The WLAN-related location positioning server 130 selects candidate cells on the basis of the terminal WLAN-related information (S518). Here, the WLAN-related location positioning server 130 designates a MAC address of a signal with highest received signal strength from the terminal WLAN-related information as a reference MAC address Ref MAC, selects grid cells including the reference MAC address in the first DB 142 as candidate cells, selects grid cells having MAC addresses corresponding to received signal strengths higher than a predetermined threshold value from the terminal WLAN-related information as the candidate cells, selects grid cells having all MAC addresses included in the terminal WLAN-related information as the candidate cells, or selects the candidate cells on the basis of wireless propagation environment information received from the mobile communication terminal 110. This is exemplary and various changes in the WLAN-related location positioning server 130 can be made to select the candidate cells without departing from the essence of the invention.

The WLAN-related location positioning server 130 calculates a first deviation value with respect to received signal strength included in the terminal WLAN-related information from received signal strengths stored in the first DB 142 and assigns a first score corresponding to the first deviation value to each grid cell (S520). Provided that the first deviation value is defined as 'd', a weight table w=d×1.35 when d is in the range of 0 to 29, w=d×1.25 when d is in the range of 30 to 39, w=d×1.15 when d is in the range of 40 to 49, w=d×1.0 when d is in the range of 50 to 59, w=d×0.9 when d is in the range of 60 to 69, w=d×0.75 when d is in the range of 70 to 79, w=d×0.6 when d is in the range of 80 to 89, and w=d×0.5 when d is greater than 90. The WLAN-related location positioning server 130 checks whether the candidate cells include a MAC address corresponding to received signal strength lower than a specific level from among MAC addresses other than the MAC address corresponding to the highest received signal strength of the terminal WLAN-related information (S522).

When the candidate cells include a MAC address corresponding to received signal strength lower than the specific level from among MAC addresses other than the MAC address corresponding to the highest received signal strength of the terminal WLAN-related information, the WLAN-related location positioning server 130 excludes the corresponding MAC address from the positioning target (S524). The WLAN-related location positioning server 130 calculates a second deviation value with respect to received signal strength included in the other MAC addresses from the received signal strengths stored in the first DB 142 and assigns a second score corresponding to the second deviation value to each grid cell (S526). The WLAN-related location positioning server 130 sums up the first and second scores allocated to each candidate cell (S528). The WLAN-related location positioning server 130 selects only cells having score sums greater than a minimum value and checks whether the number of cells having a maximum score sum, from among the cells having score sums greater than the minimum value, is one (S530).

When the number of cells having the maximum score sum, from among the cells having score sums greater than the minimum value, is one in step S530, the WLAN based location positioning server 130 determines the center value of the corresponding cell as a location value of the mobile communication terminal 110 (S532).

When the number of cells having the maximum score sum, from among the cells having score sums greater than the minimum value, is not one in step S530, the WLAN-related location positioning server 130 selects only cells having score sums greater than the minimum value and checks whether a plurality of cells has the maximum score sum from among the cells having score sums greater than the minimum value (S534).

When the number of cells having the maximum score sum, from among the cells having score sums greater than the minimum value, is two or more in step S534, the WLAN-related location positioning server 130 calculates a weighted average of the two or more cells and determines the calculated weighted average as the location value of the mobile communication terminal 110 (S536). When the number of cells having the maximum score sum, from among the cells having score sums greater than the minimum value, is not two or more in step S534, the WLAN-related location positioning server 130 performs A flow (S538). Here, A flow includes steps S540 to S552.

Upon determining that the MAC address included in the partial WLAN-related information prestored in the first DB 142 is not identical to the MAC address included in the terminal WLAN-related information from the determination result of step S512 or the number of cells having the maximum score sum from among the cells having score sums greater than the minimum value is not two or more from the result of step S534, the WLAN-related location positioning server 130 checks whether the number of MAC addresses corresponding to MAC address included in the overall WLAN-related information prestored in the second DB, from among the MAC addresses included in the received terminal WLAN-related information, is three or more (S540).

When the number of MAC addresses corresponding to MAC address included in the overall WLAN-related information prestored in the second DB from among the MAC addresses included in the received terminal WLAN-related information is three or more, the WLAN-related location positioning server 130 determines the location of the mobile communication terminal 110 by performing triangulation on the basis of the locations of APs corresponding to the three or more MAC addresses (S542). When the number of RTDs measured by the mobile communication terminal 110 is three or more, the WLAN-related location positioning server 130 may determine the location of the mobile communication terminal 110 through triangulation using the rate of the RTDs.

Here, the WLAN-related location positioning server 130 may perform triangulation only using a MAC address with high reliability information from among the MAC addresses corresponding to the MAC address included in the overall WLAN-related information prestored in the second DB 144, from among the MAC addresses included in the received terminal WLAN-related information. When a plurality of MAC addresses with high reliability information is present, the WLAN-related location positioning server 130 may perform triangulation on the basis of AP location information provided by the service provider and AP location information received from the outside.

When the number of MAC addresses corresponding to the MAC address included in the overall WLAN-related information prestored in the second DB, from among the MAC addresses included in the received terminal WLAN-related information, is not three or more in step S540, the WLAN-related location positioning server 130 checks whether the number of MAC addresses corresponding to the MAC address included in the overall WLAN-related information prestored in the second DB 144, from among the MAC addresses included in the received terminal WLAN-related information, is smaller than three and equal to or greater than two (S544).

When the number of MAC addresses corresponding to the MAC address included in the overall WLAN-related information prestored in the second DB 144, from among the MAC addresses included in the received terminal WLAN-related information, is smaller than three and equal to or greater than two, the WLAN-related location positioning server 130 calculates a weighted average on the basis of the locations of APs corresponding to the MAC addresses and determines the location of the mobile communication terminal 110 using the weighted average (S546).

When the number of MAC addresses corresponding to the MAC address included in the overall WLAN-related information prestored in the second DB 144, from among the MAC addresses included in the received terminal WLAN-related information, is not smaller than three and equal to or greater than two in step S544, the WLAN-related location positioning server 130 checks whether the number of MAC addresses corresponding to the MAC address included in the overall WLAN-related information prestored in the second DB 144, from among the MAC addresses included in the received terminal WLAN-related information, is smaller than two and equal to or greater than one (S548).

When the number of MAC addresses corresponding to the MAC address included in the overall WLAN-related information prestored in the second DB 144, from among the MAC addresses included in the received terminal WLAN-related information, is smaller than two and equal to or greater than one, the WLAN-related location positioning server 130 determines the location of AP corresponding to the MAC address as the location of the mobile communication terminal 110 (S550).

When the number of MAC addresses corresponding to the MAC address included in the overall WLAN-related information prestored in the second DB 144, from among the MAC addresses included in the received terminal WLAN-related information, is not smaller than two and equal to or greater than one in step S548, the WLAN-related location positioning server 130 determines the location of the mobile communication terminal 110 using a base station signal (S552). That is, the WLAN-related location positioning server 130 can extract a matched grid cell from the first DB 142 and determine the center value of the grid cell as the location of the mobile communication terminal 110.

Although FIG. 5 shows sequential execution of steps from S510 to S552, this is exemplary only and not to be considered as a limitation of the present invention. As will be understood by those skilled in the art, it is possible to change the order of steps shown in FIG. 5 or to execute in parallel more than one of steps S510 to S552 without departing from the essence of the invention.

As described above, the location positioning method using WLAN signals according to an embodiment of this invention shown in FIG. 5 may be implemented on a computer program and provided in a computer readable recording medium. The computer readable recording medium which encodes the computer program that implements the respective steps of the location positioning method using WLAN signals may include any kinds of recording devices for recording data readable by computers. Examples of such computer readable recording medium include ROM, RAM, CD-ROM, magnetic tapes, floppy discs, and optical data storages, and further include an implementation in carrier waves (e.g. transmission over the Internet). In addition, the computer readable recording medium may be provided in a distributed processing system where computer systems are networked to store and execute the computer readable codes at distributed locations. Furthermore, functional programs, codes, and code segments to implement an embodiment of this invention may be easily deduced by programmers skilled in the art thereof.

Figure 6:
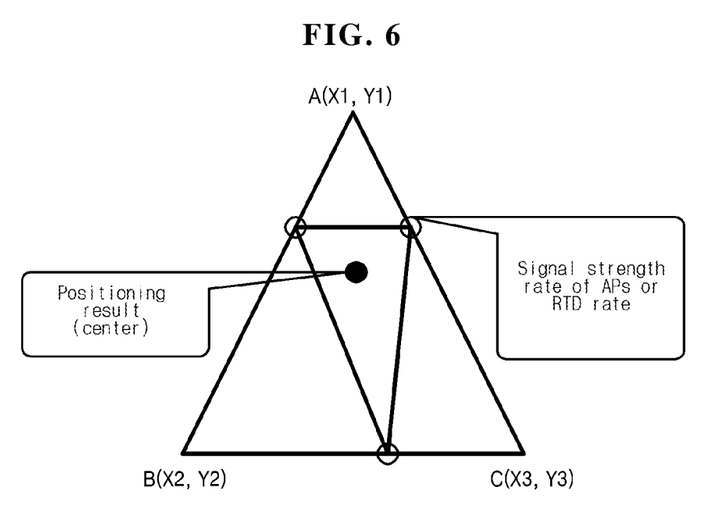
FIG. 6 is an example view illustrating triangulation technique in accordance with an embodiment of the present invention.

FIG. 6 is an example view illustrating a triangulation technique in accordance with an embodiment of the present invention.

When the WLAN-related location positioning server 130 determines that the location of the mobile communication terminal 110 cannot be determined using the first DB 142, the WLAN-related location positioning server 130 uses triangulation to determine the location of the mobile communication terminal 110 using the second DB 144.

The basic concept of triangulation performed by the WLAN-related location positioning server 130 is as shown in FIG. 6. Specifically, upon determining that the number of MAC addresses corresponding to the MAC address included in the overall WLAN-related information prestored in the second DB 144, from among the MAC addresses included in the received terminal WLAN-related information, is greater than a first number, the WLAN-related location positioning server 130 determines the location of the mobile communication terminal through triangulation on the basis of the locations of APs corresponding to the MAC addresses. Here, while the first number is preferably 3, it is not limited thereto. If the number of MAC addresses corresponding to the MAC address included in the overall WLAN-related information prestored in the second DB 144 is smaller than 3, the WLAN-related location positioning server 130 can perform triangulation. As shown in FIG. 6, the WLAN-related location positioning server 130 can calculate a center point using the rate of received signal strengths for the corresponding MAC addresses and determine the center point as the location of the mobile communication terminal 110. Here, the WLAN-related location positioning server 130 can perform triangulation only using a MAC address with high reliability information from among the MAC addresses corresponding to the MAC address included in the overall WLAN-related information prestored in the second DB 144, from among the MAC addresses included in the received terminal WLAN-related information. If a plurality of MAC addresses with high reliability information is present, the WLAN-related location positioning server 130 can perform triangulation on the basis of AP location information provided by the service provider and AP location information received from the outside.

Upon determining that the number of RTDs measured by the mobile communication terminal 110 is greater than the first number, the WLAN-related location positioning server 130 determines the location of the mobile communication terminal by performing triangulation on the basis of the RTDs. Here, while the first number is preferably 3, it is not limited thereto. That is, as shown in FIG. 6, the WLAN-related location positioning server 130 can calculate a center point using the rate of the RTDs and determine the center point as the location of the mobile communication terminal 110.

Although all elements of an embodiment of the invention may have been explained as assembled or operatively connected as a unit, this is exemplary only and not to be considered as a limitation of the invention. Alternatively, within the scope of the present invention, the respective elements may be selectively and operatively combined in any numbers. Every one of the elements may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless this disclosure expressly defines them so.

Although exemplary aspects of the present invention have been described for illustrative purposes, those skilled in the art will appreciate that various modifications, additions and substitutions are possible, without departing from essential characteristics of the invention. Thus, embodiments disclosed herein are exemplary only and not to be considered as a limitation of the invention. Accordingly, the scope of the invention is not to be limited by the above aspects but by the claims and the equivalents thereof.

INDUSTRIAL APPLICABILITY

As fully discussed above, the present invention receives a WLAN signal from a terminal that performs communication using WLAN signals and determines the location of the terminal on the basis of WLAN-related information associated with a WLAN signal, grid cells and overall WLAN-related information.

CROSS-REFERENCE TO RELATED APPLICATION

If applicable, this application claims priorities under 35 U.S.C. §119(a) on Patent Application No. 10-2010-0042628 filed in Korea on May 6, 2010, the entire contents of which are incorporated herein by reference. In addition, this non-provisional application claims priorities in countries, other than the U.S., with the same reason based on the Korean Patent Applications, the entire contents of which are hereby incorporated by reference.

What is claimed is:

1. A location positioning device using WLAN signals, the device comprising:
    a database including a first database (DB) for matching grid cells distinguished by pattern cell identification (pCell ID) with partial wireless local area network (WLAN)-related information related to a WLAN signal and stores the matched information and a second DB which stores overall WLAN-related information related to the WLAN signal;
    an information reception unit for receiving terminal wireless local area (WLAN)-related information from a terminal which performs communication by using the WLAN signal;
    a record determination unit for determining whether the same record information as the received terminal WLAN-related information is prestored in the database;
    a location positioning unit for determining a location of the terminal by using a parameter included in the received terminal WLAN-related information and the result of determining whether the same record information is prestored; and
    a first positioning target selection unit for selecting grid cells having a media access control (MAC) address included in the terminal WLAN-related information, calculating information on the distance between access points (APs) that repeat the WLAN signal by comparing partial WLAN-related information matched to the selected grid cells with the terminal WLAN-related information using the overall WLAN-related information stored in the second DB, and excluding the grid cells having a corresponding MAC address from a positioning target when the calculated distance exceeds a predetermined distance.

2. The location positioning device of claim 1, wherein the first DB is configured to match the grid cells with wireless propagation environment information and the partial WLAN-related information and stores the matched information, and the partial WLAN-related information includes at least one of a MAC address about an AP, RSS (Received Signal Strength) with respect to the MAC address, AP channel information, AP frequency information or RTD (Round Trip Delay) measured by the terminal.

3. The location positioning device of claim 1, wherein the location positioning unit is configured to determine the location of the terminal using the first DB upon determining that a MAC address included in the terminal WLAN-related information is identical to a MAC address included in the partial WLAN-related information prestored in the first DB on the basis of the determination result of the record determination unit.

4. The location positioning device of claim 3, wherein, when determining the location of the terminal using the first DB, the location positioning unit is configured to determine the location of the terminal by using at least one of information on a distance between APs that repeat the WLAN signal using the overall WLAN-related information stored in the second DB, received signal strength information of the WLAN signal, deviation information, level information, or a score according to the deviation information.

5. The location positioning device of claim 1, wherein the location positioning unit is configured to assign scores classified according to received signal strength to the terminal WLAN-related information included in the selected grid cells and determines the location of the terminal by using the sum of the assigned scores.

6. The location positioning device of claim 5, further comprising:
  a first scoring unit for selecting candidate cells from the first DB on the basis of the terminal WLAN-related information, calculating a first deviation value with respect to received signal strength included in the terminal WLAN-related information from received signal strengths stored in the first DB, and assigning a first score corresponding to the first deviation value to each grid cell,
  wherein the first scoring unit is configured to designate a MAC address of a signal with highest received signal strength in the terminal WLAN-related information as a reference MAC address, and select grid cells including the reference MAC address from the first DB as the candidate cells, select grid cells including MAC addresses corresponding to received signal strengths higher than a predetermined threshold value in the terminal WLAN-related information as the candidate cells, select grid cells including all MAC addresses included in the terminal WLAN-related information as the candidate cells, or select the candidate cells on the basis of wireless propagation environment information received from the terminal.

7. The location positioning device of claim 6, further comprising:
  a second positioning target selection unit for excluding, from the positioning target, MAC addresses corresponding to received signal strengths lower than a specific level from among MAC addresses other than the MAC address corresponding to the highest received signal strength of the terminal WLAN-related information;
  a second scoring unit for calculating a second deviation value with respect to received signal strength corresponding to the other MAC addresses from received signal strengths stored in the first DB and assigns a second score corresponding to the second deviation value to each grid cell; and
  a score aggregating unit for summing up the first and second scores assigned to each grid cell,
  wherein the location positioning unit configured to determine the location of the terminal using the score sum.

8. The location positioning device of claim 7, wherein the location positioning unit is configured to select only cells having score sums greater than a minimum value,
  wherein when the cells having score sums greater than the minimum value includes a single cell that has a maximum score sum, the location positioning unit is configured to determine the center value of the cell having the maximum score sum as a location value of the terminal, and
  wherein when the cells having score sums greater than the minimum value includes a plurality of cells that have a maximum score sum, the location positioning unit is configured to calculate a weighted average of the plurality of cells, and determines the weighted average as a location value of the terminal.

9. The location positioning device of claim 1, wherein the second DB includes at least one of MAC address information of an AP which repeats the WLAN signal, SSID information, latitude information, longitude information, altitude information, address information, information on the number of floors of a building, collection method information, collection date information, information on the number or pieces of raw data, reliability information, identification information of a base station that communicates with the terminal, or base station update date information.

10. The location positioning device of claim 1, wherein the location positioning unit is configured to determine the location of the terminal using the second DB upon determining that a MAC address included in the partial WLAN-related information prestored in the first DB is not identical to a MAC address included in the terminal WLAN-related information on the basis of the determination result of the record determination unit.

11. The location positioning device of claim 10, further comprising:
  a triangulation based positioning unit which, when the number of MAC addresses corresponding to the MAC address included in the overall WLAN-related information prestored in the second DB, from among MAC addresses included in the received terminal WLAN-related information, is greater than a first number, is configured to determine the location of the terminal by performing triangulation on the basis of locations of APs corresponding to the MAC addresses.

12. The location positioning device of claim 11, wherein the triangulation based positioning unit is configured to determine the location of the terminal by performing triangulation on the basis of RTD measured by the terminal, perform triangulation only using a MAC address with high reliability information from among the MAC addresses corresponding to the MAC address included in the overall WLAN-related information prestored in the second DB, from among the MAC addresses included in the received terminal WLAN-related information, or perform triangulation on the basis of AP location information provided by a service provider and AP location information received from the outside when a plurality of MAC addresses with high reliability information is present.

13. The location positioning device of claim 10, further comprising at least one of:
  a weighted average based positioning unit which, when the number of MAC addresses corresponding to the MAC address included in the overall WLAN-related information prestored in the second DB, from among the MAC addresses included in the received terminal WLAN-related information, is smaller than the first number and equal to or greater than a second number, is configured to determine the location of the terminal by calculating a weighted average on the basis of locations of APs corresponding to the MAC addresses;
a WLAN signal based positioning unit which, when the number of MAC addresses corresponding to the MAC address included in the overall WLAN-related information prestored in the second DB, from among the MAC addresses included in the received terminal WLAN-related information, is smaller than the second number and equal to or greater than a third number, is configured to determine the location of an AP corresponding to the MAC address as the location of the terminal; or
a base station signal based positioning unit for determining the location of the terminal using a base station signal when any one of the MAC addresses included in the received terminal WLAN-related information is not identical to the MAC address included in the overall WLAN-related information prestored in the second DB.

14. The location positioning device of claim 10, wherein the selection method information is classified as first type information (own) corresponding to AP location information provided by the service provider, second type information (other) corresponding to AP location information received from the outside, third type information corresponding to AP location information received through field survey, and fourth type information corresponding to information on an AP which collects log data of the terminal, and
wherein the first type information and the second type information are recognized as actual AP location information and the third type information and the fourth type information are recognized as estimated AP location information.

15. The location positioning device of claim 14, further comprising:
a reliability classifying unit for classifying the reliability information on the basis of the first type information, the second type information, the third type information and the fourth type information.

16. The location positioning device of claim 15, wherein the location positioning unit is configured to determine the location of the terminal only using overall WLAN-related information set to high reliability on the basis of the classified reliability information.

17. The location positioning device of claim 15, wherein when first additional information corresponding to overall WLAN-related information including the third type information or the fourth type information is additionally provided to the second DB while first stored information corresponding to overall WLAN-related information including the first type information or the second type information is previously stored in the second DB, the reliability classifying unit is configured to set reliability information of the first additional information to high reliability if a MAC address of the first additional information is not identical to a MAC address of the first stored information, and calculate a distance difference using AP location information corresponding to the first stored information and AP location information corresponding to the first additional information if the MAC address of the first additional information is identical to the MAC address of the first stored information, and
wherein the reliability classifying unit is configured to set the reliability information of the first stored information to high reliability and set the reliability information of the first additional information to low reliability when the calculated distance difference is within a predetermined distance, and set the reliability information of the first stored information to low reliability and sets the reliability information of the first additional information to high reliability when the calculated distance difference exceeds a predetermined distance.

18. The location positioning device of claim 15, wherein when second additional information corresponding to overall WLAN-related information including the first type information or the second type information is additionally provided to the second DB while second stored information corresponding to overall WLAN-related information including the third type information or the fourth type information is previously stored in the second DB, the reliability classifying unit is configured to set reliability information of the second additional information to high reliability if a MAC address of the second additional information is not identical to a MAC address of the second stored information, and calculate a distance difference using AP location information corresponding to the second stored information and AP location information corresponding to the second additional information if the MAC address of the second additional information is identical to the MAC address of the second stored information, and
wherein the reliability classifying unit is configured to set the reliability information of the second additional information to high reliability and sets the reliability information of the second stored information to low reliability when the calculated distance difference is within a predetermined distance, and set the reliability information of the second additional information to high reliability and sets the reliability information of the second stored information to low reliability when the calculated distance difference exceeds a predetermined distance.

19. A location positioning method using WLAN signals, the method comprising:
receiving terminal WLAN-related information from a terminal which performs communication by using a WLAN signal;
determining whether the same record information as the received terminal WLAN-related information is prestored in the database;
determining a location of the terminal by using a parameter included in the received terminal WLAN-related information and the result of positioning on whether the same record information is prestored;
selecting grid cells having a media access control (MAC) address included in the terminal WLAN-related information;
calculating information on the distance between access points (APs) that repeat the WLAN signal by comparing partial WLAN-related information matched to the selected grid cells with the terminal WLAN-related information using the overall WLAN-related information stored in the second DB; and
excluding the grid cells having a corresponding MAC address from a positioning target when the calculated distance exceeds a predetermined distance.

* * * * *